April 7, 1970     L. J. BOHENEK     3,504,551
PLASTIC HINGED RING AND LOCKING DEVICE FOR GAUGE
Filed March 7, 1968
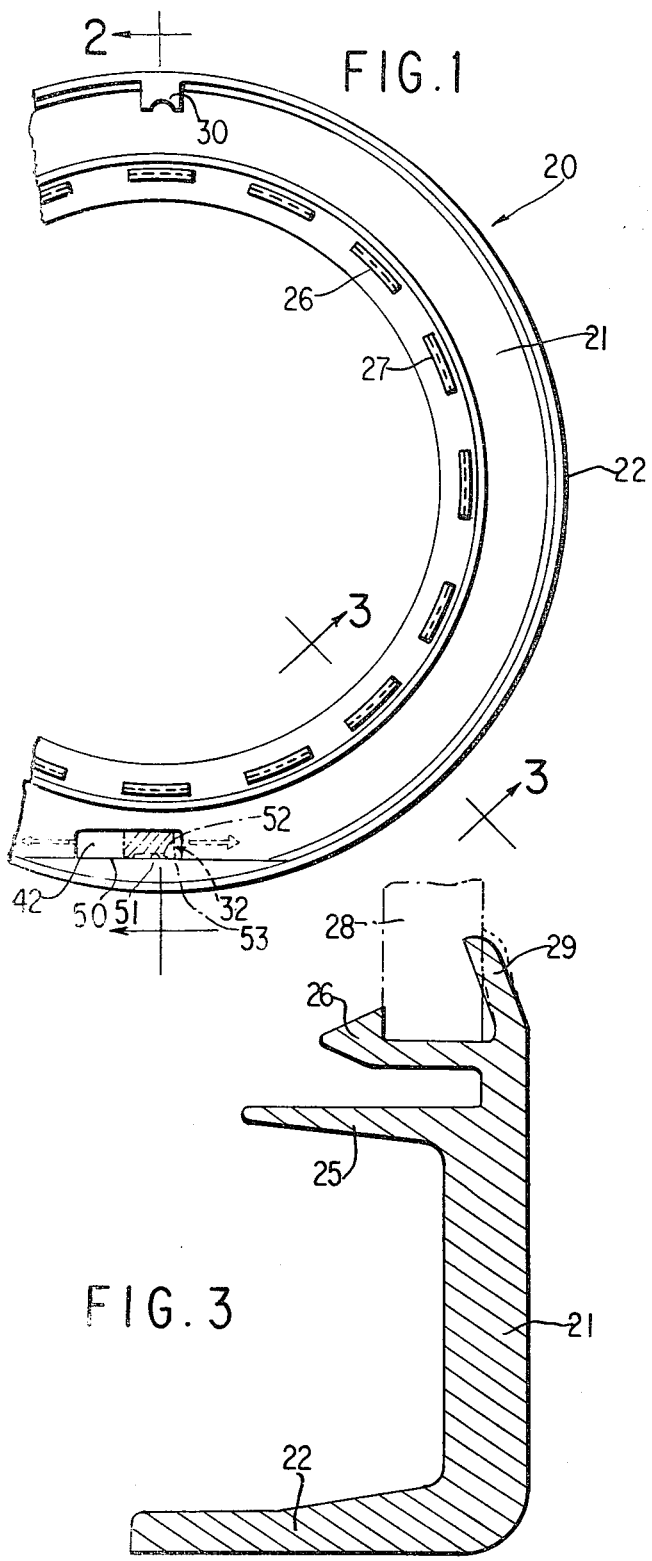
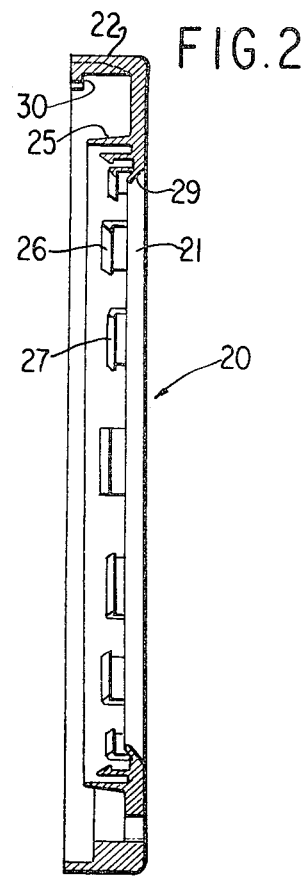
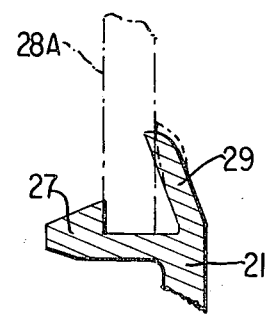
INVENTOR
Leonard J. Bohenek
BY
Smyth & Moore
ATTORNEYS

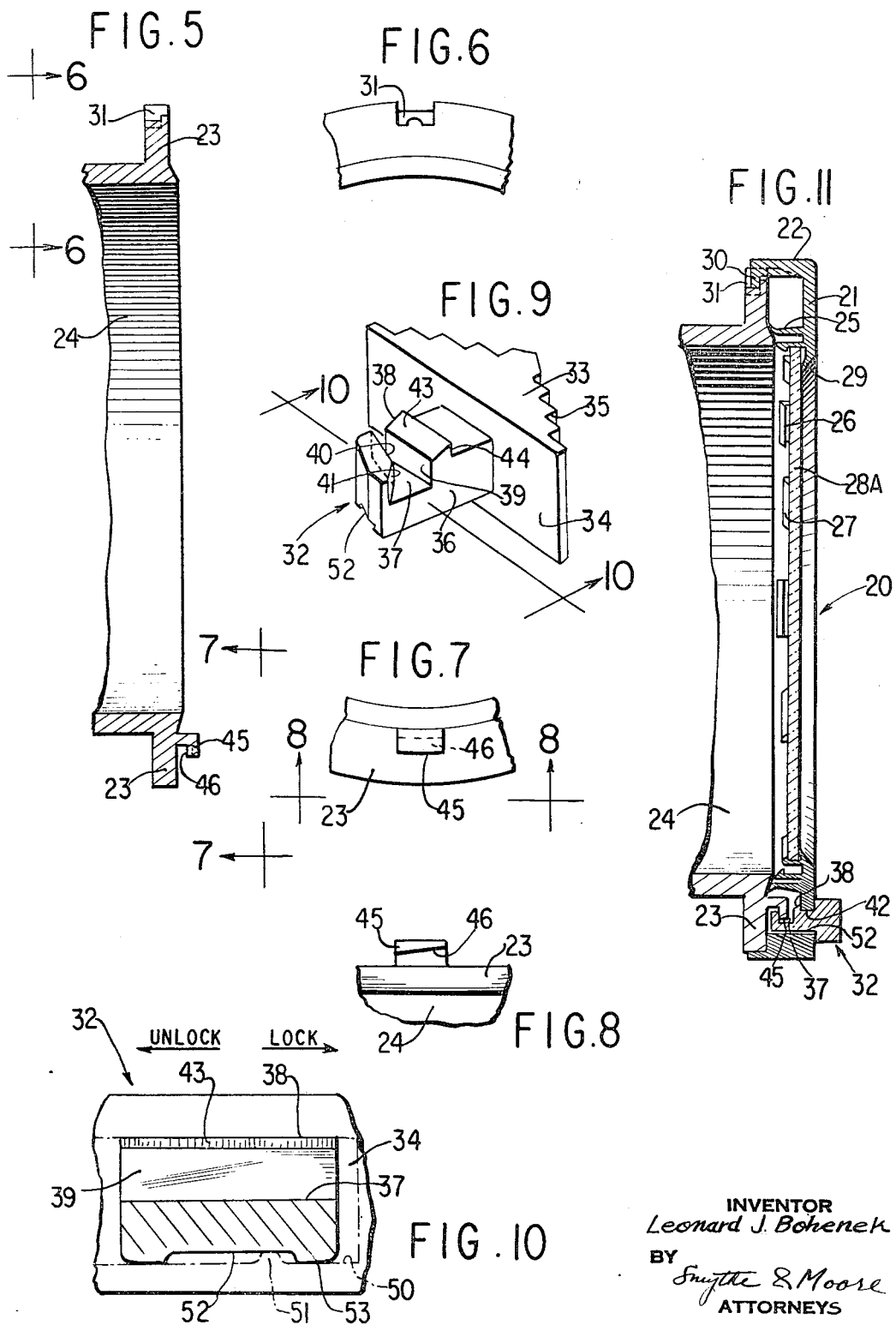

United States Patent Office 3,504,551
Patented Apr. 7, 1970

3,504,551
PLASTIC HINGED RING AND LOCKING DEVICE FOR GAUGE
Leonard J. Bohenek, Northampton, Pa., assignor to Ametek, Inc., New York, N.Y., a corporation of Delaware
Filed Mar. 7, 1968, Ser. No. 711,352
Int. Cl. G01p 1/02
U.S. Cl. 73—431                                      9 Claims

ABSTRACT OF THE DISCLOSURE

A hinged-type closure member or bezel for the dial face of an instrument or the like in which a cam locking member having cam surfaces is snap-fitted into the bezel and slidably cooperates with locking means on the instrument casing.

---

This invention relates to a bezel for supporting a transparent closure over the dial face of an instrument gauge or the like and more particularly to a hinged-type bezel.

In copending application Ser. No. 708,991, filed Feb. 28, 1968, there is disclosed a bezel for supporting transparent closure members of different thickness on the open face of an instrument gauge or the like. While not limited to a supporting member for closures of different thickness, an object of the present invention is the provision of a hinged-type bezel of the general type disclosed in the aforesaid application.

A further object of the present invention is the provision of a hinged-type bezel which prevents leakage of moisture and dust into the instrument casing.

A further object is to provide a hinged bezel which is cam locked.

A further object is to provide a hinged bezel in which a cammed locking device is snap-fitted into the bezel.

In one aspect of the invention, a plastic flanged ring having inturned resilient lips for retaining a transparent closure member has an inturned hook-like member adapted to be received in a cooperating notch on the gauge casing to provide a hinge. A cam-shaped locking member adapted for annular or sidewise movement is snap-fitted into the plastic ring. Cooperating locking on the gauge casing is provided for engaging the cam locking member.

The above and other objects, features and advantages of the invention will be apparent from the following description taken in conjunction with the accompanying drawings which illustrate an exemplary embodiment of the invention.

In the drawings:

FIG. 1 is a partial elevational view of the inner side of a bezel constructed in accordance with the present invention;

FIG. 2 is a transverse section taken on the line 2—2 of FIG. 1;

FIG. 3 is a cross-sectional view taken in the direction of the arrows 3—3 in FIG. 1, the transparent closure being shown in dashed lines;

FIG. 4 is a cross-sectional view similar in part to FIG. 3 but illustrating the accommodation of a transparent closure of less thickness;

FIG. 5 is a transverse sectional view through the instrument gauge housing adjacent the open dial face thereof;

FIG. 6 is a fragmentary elevational view taken on the line 6—6 of FIG. 5;

FIG. 7 is a fragmentary elevational view taken on the line 7—7 of FIG. 5;

FIG. 8 is a fragmentary elevation taken on the line 8—8 of FIG. 7;

FIG. 9 is a perspective of the locking device carried by the hinged bezel ring;

FIG. 10 is a view of the locking device taken on the line 10—10 of FIG. 9, the surface upon which it slides and cooperates being shown in dot-dash lines; and FIG. 11 is a transverse section illustrating the bezel and transparent closure in place on the gauge housing.

Referring to the drawings and more particularly to FIGS. 1, 2, and 11, there is a bezel retaining ring 20 which is preferably made from a plastic material such as black pigmented polypropylene and comprises an annular lens retaining portion 21 and a flange or skirt portion 22 adapted to fit over a flange 23 (FIGS. 5 and 11) on the open end of an instrument or gauge housing 24. The portion 21 carries a flexible annular lip or sealing member 25 (FIGS. 2, 3, and 11) adapted to engage the housing 24 and a plurality of resilient lips 26 and 27 adapted flexibly to engage the inner surface of a transparent closure member or lens 28 or 28A (FIGS. 3, 4, and 11). As shown in FIGS. 3 and 4, and more particularly described in the aforesaid copending application Ser. No. 708,991, the alternate lips 26 and 27 have different lengths to accommodate lenses of different thickness. The inner edge of the portion 21 of the bezel 20 is provided with an inwardly inclined flexible portion 29 adapted resiliently to engage the outer surface of the transparent closure member and retain the same in the bezel as also best shown in FIGS. 3 and 4.

To provide a hinge-like connection for the bezel retaining ring 20, the flange 22 of the bezel is provided with a depending tongue 30 adapted to interengage a stepped recess or notch 31 provided in the flange 23 of gauge housing 24. To provide for securely locking the bezel 20 in sealed relationship with respect to the gauge housing or casing 24, a locking device or latch member 32 is also provided on the bezel diametrically opposite to the tongue 30. As best shown in FIGS. 9 and 10, this locking device comprises a carrier member 33 having a flat inner surface 34 and a fluted or pyramided outer surface 35. Extending inwardly of the member 33 is a projection 36 having a cam recess or groove 37 and an upwardly extending projection or portion 38. The groove 37, for example, may comprise a relatively flat side 39 and a double cam side 40–41, the portion 41 having a greater incline to assist in engagement of the locking member.

The locking device or member 32 is adapted to be snap-fitted into a longitudinally extending slot 42 (FIG. 1) provided in the plastic-like bezel 20, the upwardly extending projection 38 being provided with a sloping inner surface 43 adapted to be pushed into the slot and a flat outer surface 44 adapted to engage the inner side of the bezel. The proportioning of the parts is such that the locking device is securely attached to the bezel, but is capable of sliding motion sidewise of the slot 42 by finger pressure on the fluted portion 35.

The locking device 32 cooperates with a locking lug or finger 45 provided on the housing flange 23 opposite the recess or notch 31. As best shown in FIGS. 5, 7, and 8, the downwardly extending portion of the lug or finger 45 is preferably provided with an inclined or cam surface 46 which engages the cammed surfaces 41 and 40 of the locking member 32 and locks the bezel or retaining ring 20 in sealing engagement with the housing or casing 24.

In order to hold the locking means in the position to which it has been moved, the bottom surface 50 of aperture 42 (FIGS. 1, 10), may have a ridge 51 engageable with the slot 52 in the bottom of projection 36. When the locking means 32 is moved to the left (FIG. 1), the portion 53 will be moved over ridge 51 so that the latch will be held in its left position by the ridge 51.

While an exemplary embodiment of the invention has been illustrated and described, it will be apparent that changes, modifications and alterations may be made therein without departing from the spirit of the invention.

What is claimed is:

1. In a bezel for instrument gauges, the combination including a gauge housing, a plastic-like retaining ring having an annular portion for holding a transparent closure and a flanged skirt portion for engaging said housing, interengaging means on said housing and ring flange for hingedly mounting said retaining ring on said housing for swinging said ring about a fixed point away from said housing, a separate locking member slideably supported on said annular portion of the retaining ring in a position substantially opposite to said interengaging means, said locking member having a cam surface positioned inwardly of said annular portion, and locking means mounted on said housing for engagement with said cam surface upon sliding movement of said locking member.

2. A combination as defined in claim 1 wherein said housing is provided with an out-turned annular flange, said flanged skirt of said retaining ring surrounds said housing flange.

3. A combination as defined in claim 2 in which said housing interengaging means comprises a member having a stepped notch and said locking means has an inclined cam surface.

4. A combination as defined in claim 1 in which said annular portion of said retaining ring is provided with an annular flexible lip positioned for sealing engagement with said housing.

5. A combination as defined in claim 4 wherein said annular portion is provided with flexible lips of alternate different lengths to support transparent closure members of different thickness.

6. A combination as defined in claim 1 wherein said locking member includes an outer member adapted slideably to engage the outer surface of said annular portion of the retaining ring, an inwardly extending portion adapted to extend through a slot provided in said annular portion, and a projection on said inwardly extending portion adapted to snap-fit the locking member on said annular portion.

7. A combination as defined in claim 6 in which said projection includes a substantially flat surface adapted to engage the inner surface of said annular portion of the retaining ring, and an inwardly inclined surface adapted to assist in the snap-fitting of the locking member into said slot of the annular member.

8. A combination as defined in claim 6 in which said inwardly extending portion of said locking member is provided with a grooved slot positioned inwardly of said projection and extending substantially transversely of the inwardly extending portion, and at least one of the side walls of said slot is provided with a wedging cam surface.

9. A combination as set forth in claim 1 in which said annular portion of said retaining ring is provided with a longitudinally extending slot positioned substantially diametrically opposite to said interengaging means, said locking member includes an inwardly extending portion adapted for insertion through said slot, a projection on said inwardly extending member provides for snap-fitting the locking member on said annular portion, a transversely extending grooved slot is provided on said inwardly extending portion inwardly of said projection, said grooved slot is provided with a longitudinally extending cam surface, said locking means on said gauge housing comprises a lug-like member having a finger portion spaced outwardly from the open end of the housing, and a cam surface on said finger portion is adapted wedgedly to engage said cam surface on said grooved slot.

References Cited

UNITED STATES PATENTS

| 2,402,360 | 6/1946 | Bevins | 73—431 X |
| 2,581,734 | 1/1952 | Triplett | 73—431 |
| 3,187,582 | 6/1965 | Perkins et al. | 73—431 |
| 3,386,239 | 6/1968 | Shiffman | 58—91 |

FOREIGN PATENTS

| 843 | 1913 | Great Britain. |
| 889,185 | 2/1962 | Great Britain. |
| 137,257 | 12/1929 | Belgium. |

LOUIS R. PRINCE, Primary Examiner

D. M. YASICH, Assistant Examiner

U.S. Cl. X.R.

292—257